US011130580B2

United States Patent
Suciu et al.

(10) Patent No.: US 11,130,580 B2
(45) Date of Patent: Sep. 28, 2021

(54) ELECTRO-PNEUMATIC ENVIRONMENTAL CONTROL SYSTEM AIR CIRCUIT

(71) Applicant: United Technologies Corporation, Farmington, CT (US)

(72) Inventors: Gabriel L. Suciu, Glastonbury, CT (US); Brian Merry, Andover, CT (US); Stephen H. Taylor, East Hartford, CT (US); Charles E. Lents, Amston, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 624 days.

(21) Appl. No.: 15/809,244

(22) Filed: Nov. 10, 2017

(65) Prior Publication Data

US 2018/0163627 A1 Jun. 14, 2018

Related U.S. Application Data

(60) Provisional application No. 62/432,110, filed on Dec. 9, 2016.

(51) Int. Cl.
*F02C 6/08* (2006.01)
*B64D 13/08* (2006.01)
(Continued)

(52) U.S. Cl.
CPC ............. *B64D 13/08* (2013.01); *B64D 27/10* (2013.01); *F01D 15/10* (2013.01); *F02C 3/04* (2013.01); *F02C 6/08* (2013.01); *F02C 7/185* (2013.01); *F02C 9/18* (2013.01); *F02K 3/04* (2013.01); *F02K 3/06* (2013.01); *F02K 3/115* (2013.01); *H02K 7/1823* (2013.01);
(Continued)

(58) Field of Classification Search
CPC .. F02C 6/08; F02C 7/141; F02C 7/143; F02C 7/185; F05D 2260/213; B64D 13/06; B64D 2013/0611; B64D 13/02; B64D 2013/0618
See application file for complete search history.

(56) References Cited

U.S. PATENT DOCUMENTS 4,474,001 A 10/1984 Griffin et al.
5,063,963 A * 11/1991 Smith ....................... F02C 9/16
137/606
(Continued)

FOREIGN PATENT DOCUMENTS

EP 2960467 12/2015
GB 2234805 2/1991

OTHER PUBLICATIONS

European Search Report for Application No. 17206288.7 dated Apr. 19, 2018.

*Primary Examiner* — Gerald L Sung
*Assistant Examiner* — Marc J Amar
(74) *Attorney, Agent, or Firm* — Carlson, Gaskey & Olds, P.C.

(57) ABSTRACT

An engine driven environmental control system (ECS) air circuit includes a gas turbine engine having a compressor section. The compressor section includes a plurality of compressor bleeds. A selection valve selectively connects each of said bleeds to an input of an intercooler. A second valve is configured to selectively connect an output of said intercooler to at least one auxiliary compressor. The output of each of the at least one auxiliary compressors is connected to an ECS air input.

9 Claims, 2 Drawing Sheets

(51) Int. Cl.

| | | |
|---|---|---|
| *F02C 9/18* | (2006.01) | |
| *F02K 3/115* | (2006.01) | |
| *B64D 27/10* | (2006.01) | |
| *F01D 15/10* | (2006.01) | |
| *F02C 3/04* | (2006.01) | |
| *F02K 3/06* | (2006.01) | |
| *H02K 7/18* | (2006.01) | |
| *F02C 7/18* | (2006.01) | |
| *F02K 3/04* | (2006.01) | |
| *B64D 13/06* | (2006.01) | |

(52) U.S. Cl.
CPC .......... *B64D 2013/0603* (2013.01); *B64D 2013/0618* (2013.01); *B64D 2013/0644* (2013.01); *F05D 2220/323* (2013.01); *F05D 2240/40* (2013.01); *F05D 2260/211* (2013.01)

(56) References Cited

U.S. PATENT DOCUMENTS

| | | | |
|---|---|---|---|
| 5,117,629 A * | 6/1992 | Shaw | F04D 29/522 415/115 |
| 5,137,230 A * | 8/1992 | Coffinberry | B64C 21/06 244/118.5 |
| 5,203,163 A | 4/1993 | Parsons | |
| 5,363,641 A * | 11/1994 | Dixon | F02C 6/08 60/226.1 |
| 5,452,573 A | 9/1995 | Glickstein et al. | |
| 5,511,374 A * | 4/1996 | Glickstein | F02C 6/08 60/782 |
| 6,189,324 B1 * | 2/2001 | Williams | B64D 41/00 62/172 |
| 7,856,824 B2 | 12/2010 | Anderson et al. | |
| 8,161,726 B2 | 4/2012 | Schwarz | |
| 8,266,888 B2 | 9/2012 | Liu | |
| 8,397,487 B2 | 3/2013 | Sennoun et al. | |
| 8,522,529 B2 | 9/2013 | Martinou et al. | |
| 8,776,952 B2 | 7/2014 | Schwarz et al. | |
| 8,904,805 B2 | 12/2014 | Hipsky | |
| 8,967,528 B2 | 3/2015 | Mackin et al. | |
| 9,234,481 B2 | 1/2016 | Suciu et al. | |
| 9,422,063 B2 | 8/2016 | Diaz | |
| 10,161,783 B2 * | 12/2018 | Zywiak | B64D 1/00 |
| 10,571,316 B2 * | 2/2020 | Gaully | F02C 6/08 |
| 2004/0141836 A1 * | 7/2004 | McAuliffe | F04D 25/04 415/145 |
| 2006/0042227 A1 * | 3/2006 | Coffinberry | F02C 7/32 60/226.1 |
| 2006/0231680 A1 * | 10/2006 | Derouineau | B64D 13/02 244/118.5 |
| 2007/0271952 A1 * | 11/2007 | Lui | B64D 13/06 62/402 |
| 2010/0192593 A1 * | 8/2010 | Brown | F02C 6/08 60/782 |
| 2012/0045317 A1 * | 2/2012 | Saladino | F02C 6/08 415/145 |
| 2012/0161965 A1 * | 6/2012 | Babu | F02C 9/00 340/540 |
| 2013/0040545 A1 * | 2/2013 | Finney | B64D 13/02 454/71 |
| 2013/0118191 A1 * | 5/2013 | Zywiak | B64D 13/06 62/87 |
| 2013/0192238 A1 * | 8/2013 | Munsell | F02C 7/18 60/772 |
| 2013/0192250 A1 * | 8/2013 | Glahn | F02C 7/28 60/782 |
| 2014/0196469 A1 | 7/2014 | Finney | |
| 2014/0250898 A1 * | 9/2014 | Mackin | F02C 3/13 60/772 |
| 2014/0284395 A1 * | 9/2014 | Pilon | F02K 1/1207 239/11 |
| 2015/0004011 A1 * | 1/2015 | Army | F04F 5/14 417/226 |
| 2015/0107261 A1 * | 4/2015 | Moes | B64D 13/06 60/783 |
| 2015/0121842 A1 * | 5/2015 | Moes | F02C 6/08 415/1 |
| 2015/0176501 A1 * | 6/2015 | Mackin | F02C 6/08 415/1 |
| 2015/0233291 A1 | 8/2015 | Pelagatti et al. | |
| 2015/0251766 A1 * | 9/2015 | Atkey | F25B 31/026 244/13 |
| 2015/0275769 A1 * | 10/2015 | Foutch | F02C 7/047 60/776 |
| 2015/0285090 A1 * | 10/2015 | Munsell | F04D 29/325 415/1 |
| 2015/0308339 A1 | 10/2015 | Forcier | |
| 2015/0354464 A1 | 12/2015 | Hillel | |
| 2016/0167789 A1 * | 6/2016 | Knight | B64D 13/02 454/71 |
| 2016/0167792 A1 * | 6/2016 | Greenberg | F02C 7/047 415/116 |
| 2016/0215732 A1 | 7/2016 | Malecki | |
| 2016/0231068 A1 | 8/2016 | Schmitz et al. | |
| 2016/0237906 A1 | 8/2016 | Suciu et al. | |
| 2016/0369697 A1 | 12/2016 | Schwarz et al. | |
| 2016/0369705 A1 * | 12/2016 | Mackin | F02C 6/08 |
| 2017/0002747 A1 | 1/2017 | Fert et al. | |
| 2017/0044984 A1 | 2/2017 | Pesyna et al. | |
| 2017/0082028 A1 | 3/2017 | Duong | |
| 2017/0101937 A1 * | 4/2017 | Schlarman | F02C 9/18 |
| 2017/0113808 A1 | 4/2017 | Bond | |
| 2017/0241340 A1 * | 8/2017 | Feulner | F02C 6/08 |
| 2018/0057171 A1 * | 3/2018 | Sautron | B64D 13/06 |
| 2019/0263528 A1 * | 8/2019 | Casado-Montero | B64D 13/08 |

* cited by examiner

ELECTRO-PNEUMATIC ENVIRONMENTAL CONTROL SYSTEM AIR CIRCUIT

CROSS-REFERENCE TO RELATED APPLICATION

This application claims priority to U.S. Provisional Patent Application No. 62/432,110 filed Dec. 9, 2016.

TECHNICAL FIELD

The present disclosure relates generally to aircraft air systems, and more specifically to an air circuit for providing air to an environmental control system.

BACKGROUND

Aircraft, such as commercial airliners, typically include multiple gas turbine engines configured to generate thrust. The gas turbine engines include a compressor section that compresses air, a combustor section that mixes the air with a fuel and ignites the mixture, and a turbine section across which the resultant combustion products are expanded.

As the compressor section draws in atmospheric air and compresses it, the air from the compressor section is suitable for provision to the environmental control system (ECS) of the aircraft. In existing ECS configurations, air is bled from the compressor section at a temperature and a pressure in excess of the temperature and pressure required by the ECS and is conditioned using a pre-cooler. After being pre-cooled the air is provided to the ECS, and excess pressure is dumped from the ECS. The excess pressure dump results in an overall efficiency loss to the engine.

SUMMARY OF THE INVENTION

In one exemplary embodiment an engine driven environmental control system (ECS) air circuit includes a gas turbine engine including a compressor section, the compressor section including a plurality of compressor bleeds, a selection valve selectively connecting each of said bleeds to an input of an intercooler, and a second valve configured to selectively connect an output of said intercooler to at least one auxiliary compressor, the output of each of the at least one auxiliary compressors being connected to an ECS air input.

In another example of the above described engine driven ECS air circuit the at least one auxiliary compressor comprises a plurality of auxiliary compressors.

In another example of any of the above described engine driven ECS air circuits at least one of said compressor bleeds is a compressor bleed positioned between a low pressure compressor and a high pressure compressor.

In another example of any of the above described engine driven ECS air circuits the intercooler is an air to air heat exchanger.

In another example of any of the above described engine driven ECS air circuits a heat sink of the air to air heat exchanger is fan air.

Another example of any of the above described engine driven ECS air circuits further includes an aircraft controller controllably connected to the selection valve and to the second valve such that the aircraft controller controls a state of the selection valve and a state of the second valve.

In another example of any of the above described engine driven ECS air circuits the aircraft controller includes a memory storing instructions configured to cause the controller to connect a bleed having a required flowrate for an ECS operating requirement, and wherein the connected bleed has a pressure requirement below a pressure requirement of the ECS inlet.

In another example of any of the above described engine driven ECS air circuits the at least one auxiliary compressor comprises a plurality of auxiliary compressors and wherein the aircraft controller includes a memory storing instructions configured to cause the controller to alternate auxiliary compressors operating as a primary compressor on a per flight basis.

In another example of any of the above described engine driven ECS air circuits the plurality of compressor bleeds comprises at least four bleeds.

In another example of any of the above described engine driven ECS air circuits at least one of said at least one auxiliary compressors includes an electric motor, and wherein the electric motor is configured to drive rotation of the corresponding auxiliary compressor.

In another example of any of the above described engine driven ECS air circuits at least one of said at least one auxiliary compressor includes a mechanical motor, and wherein the mechanical motor is configured to drive rotation of the corresponding auxiliary compressor.

An exemplary method for supplying engine air to an environmental control system (ECS) includes selecting compressor bleed from a plurality of compressor bleeds, the selected compressor bleed providing air at a higher temperature than a required ECS inlet air temperature maximum and at a lower pressure than a required ECS inlet air pressure, cooling the bleed air from the selected bleed using an intercooler such that the bleed air is below the required ECS inlet air temperature maximum, compressing the bleed air using at least one auxiliary compressor such that the bleed air is at least the required ECS inlet air pressure, and providing the cooled compressed bleed air to an ECS air inlet.

In another example of the above described exemplary method for supplying air to an ECS bleed air is cooled by the intercooler prior to be compressed, thereby decreasing a magnitude of work required to compress the bleed air to the desired pressure.

In another example of any of the above described exemplary methods for supplying air to an ECS compressing the bleed air using the at least one auxiliary compressor comprises driving rotation of the at least one auxiliary compressor via an electric motor.

In another example of any of the above described exemplary methods for supplying air to an ECS selecting a compressor bleed from a plurality of compressor bleeds comprises selecting a corresponding compressor bleed from each of multiple engines simultaneously.

In another example of any of the above described exemplary methods for supplying air to an ECS compressing the bleed air using at least one auxiliary compressor comprises simultaneously operating at least two auxiliary compressors in response to at least one of the engines shutting down.

In another example of any of the above described exemplary methods for supplying air to an ECS compressing the bleed air using at least one auxiliary compressor further comprises alternating a primary compressor between a plurality of auxiliary compressors on a per flight basis.

These and other features of the present invention can be best understood from the following specification and drawings, the following of which is a brief description.

DETAILED DESCRIPTION OF AN EMBODIMENT

Figure 1:
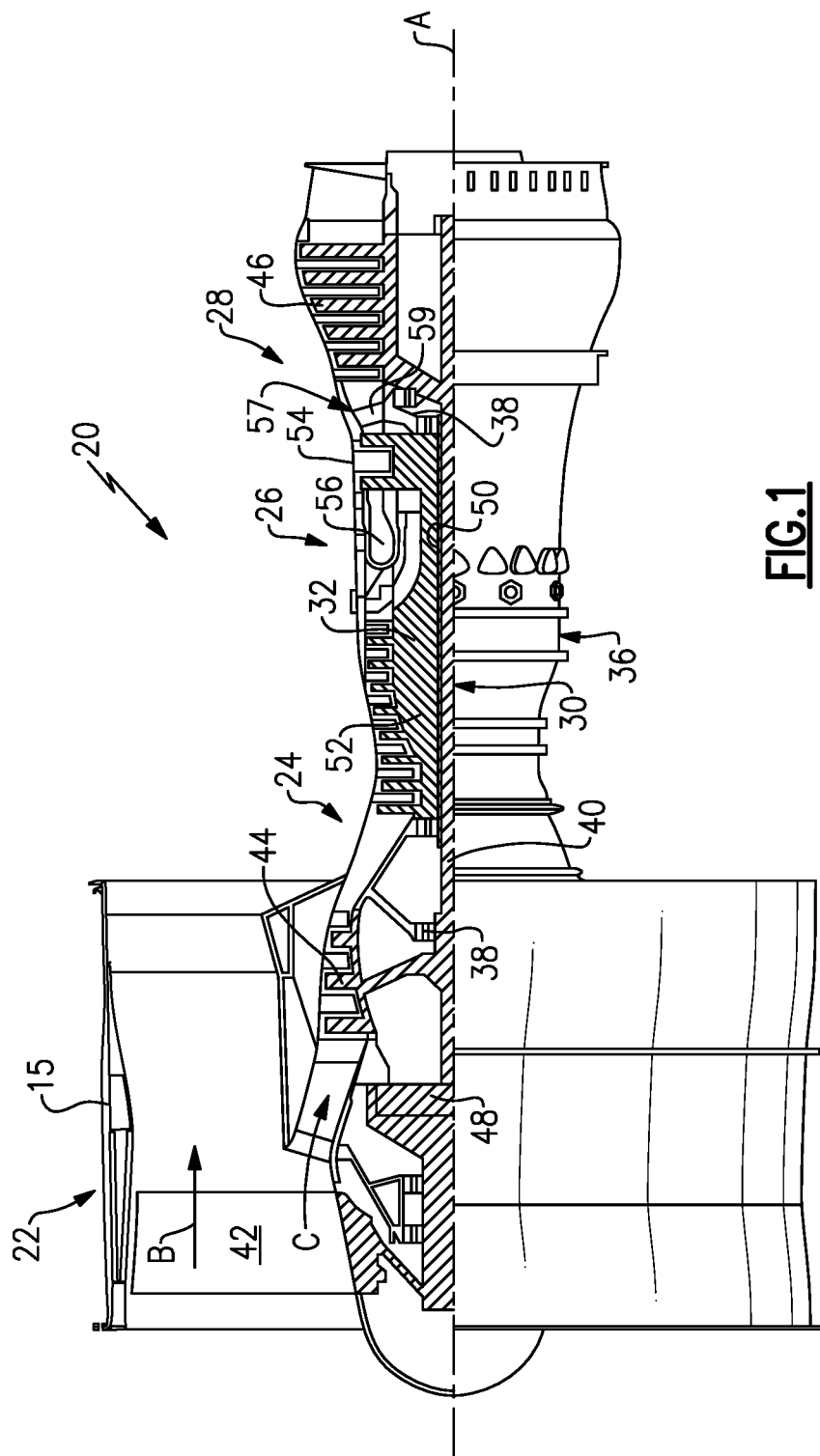
FIG. 1 illustrates an exemplary gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10668 meters). The flight condition of 0.8 Mach and 35,000 ft (10668 m), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram °R)/(518.7°R)]^0.5. The "Low corrected fan tip speed" as disclosed herein according to one non-limiting embodiment is less than about 1150 ft/second (350.5 m/s).

Figure 2:
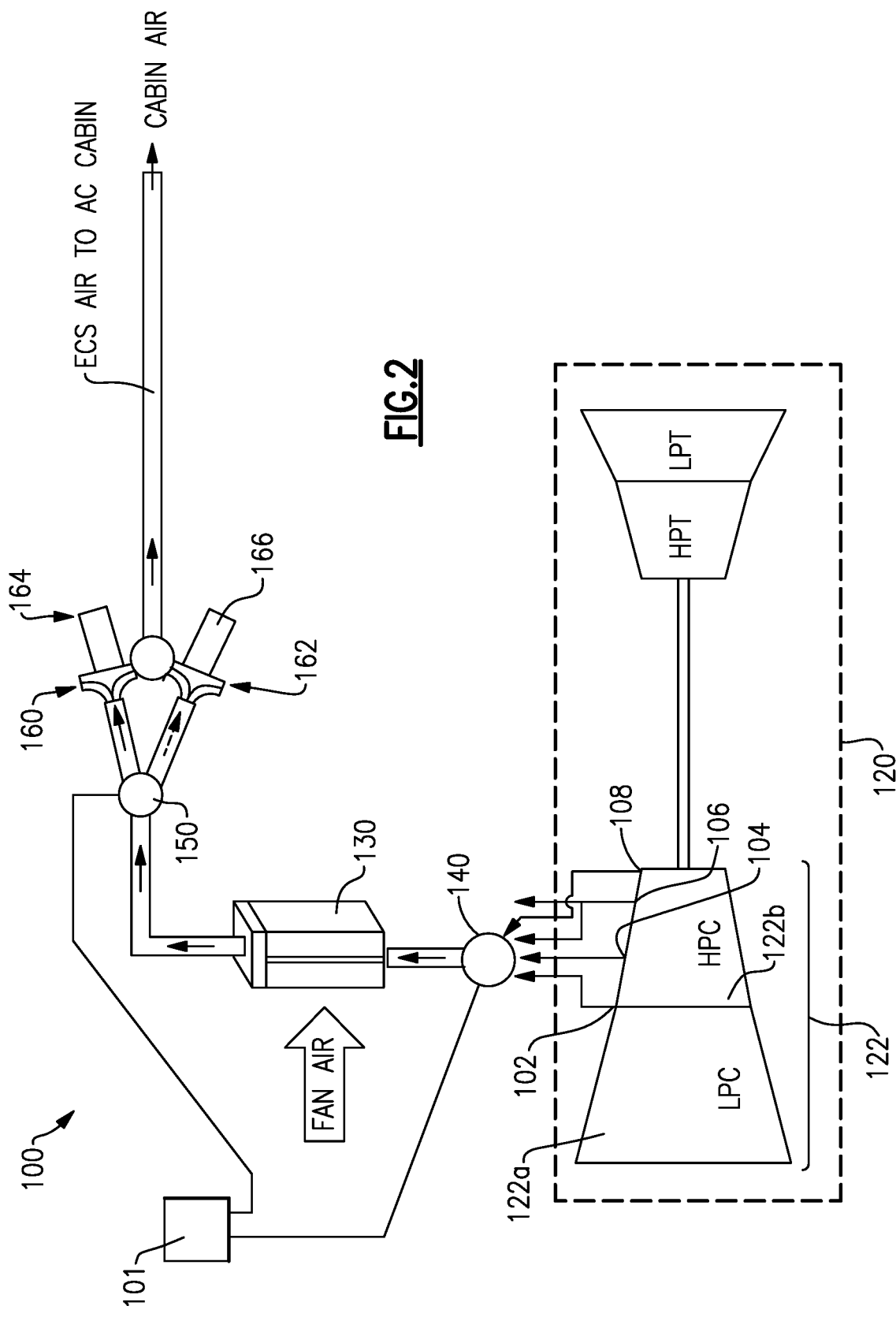
FIG. 2 schematically illustrates an electro-pneumatic environmental control system (ECS) air circuit for an aircraft.

In order to provide air from the compressor section 24 to the aircraft environmental control system (ECS), multiple bleeds are incorporated in the compressor section 24 (illustrated schematically in FIG. 2). Each of the bleeds withdraws air from the compressor section 24 at a given compressor stage according to known aircraft bleed techniques and using known bleed apparatuses. Contemporary aircraft systems for providing air to an ECS bleed air from a stage necessary to meet a required flow rate of the ECS. Bleeding at these stages, however, necessitates bleeding air at a temperature that is in excess of a maximum allowable temperature, and at a pressure that is in excess of a maximum allowable pressure for the ECS. In order to reduce the temperature, a pre-cooler heat exchanger is positioned in the air circuit and reduces the temperature of the bleed air before the bleed air is provided to the ECS. Once at the ECS, the excess pressure is dumped, resulting in air provided to the ECS that meets the temperature, pressure and flow requirements. Pressurization of the air passing through the compressor section 24 requires energy, and the provision of excess pressure to the ECS constitutes waste, and decreases the efficiency at which the engine 20 can be operated.

FIG. 2 schematically illustrates an electro-pneumatic ECS air circuit 100 that reduces the inefficiencies associated with providing air from a compressor to an ECS. The electro-pneumatic ECS air circuit 100 includes multiple bleeds 102, 104, 106, 108 within a compressor section 122 of an engine 120. Each of the bleeds 102, 104, 106, 108 is connected to an intercooler 130 via a selection valve 140. The intercooler 130 operates as a heat exchanger to cool the bleed air. In the exemplary illustration, the bleeds 102, 104, 106, 108 are positioned at an inter-compressor stage between a low pressure compressor 122a, and a high pressure compressor 122b (bleed 102), and at a high pressure compressor 122b third stage (bleed 104), $6^{th}$ stage (bleed 106), and $8^{th}$ stage (bleed 108). In alternative example engines, the bleed locations can be positioned at, or between, alternative compressor stages, depending on the specific flow, temperature, and pressure requirements of the aircraft incorporating the engine 120. In yet further alternative example engines 120, alternative numbers of bleeds can be utilized depending on the specific requirements of the aircraft.

An aircraft controller 101 controls the selection valve 140 such that, at any given time, air is provided from a bleed 102, 104, 106, 108 having the appropriate flow requirements of the ECS at the current operating conditions of the aircraft. While the bleed 102, 104, 106, 108 selected by the controller 101 provides air at acceptable flow levels, the bleed 102, 104, 106, 108 is selected to provide air that is under pressured. In other words, the pressure of the air provided by the selected bleed 102, 104, 106, 108 is below the pressure required by the ECS. Further, the air selected exceeds the temperature requirements of the ECS.

After passing through the selection valve 140, the air is passed to the intercooler 130. The intercooler 130 is a heat exchanger that cools the bleed air prior to providing the air to the ECS. The exemplary intercooler 130 utilizes fan air, provided from the bypass flowpath of the engine 120, to cool the air in a conventional air to air heat exchanger format. In alternative examples, alternative style heat exchangers can be utilized as the intercooler 130 to similar effect.

Cooled air from the intercooler 130 is provided to a second valve 150. The second valve 150 is controlled by the aircraft controller 101 and provides air to a first auxiliary compressor 160, a second auxiliary compressor 162, or both the first and second auxiliary compressor 160, 162. Each of the auxiliary compressors 160, 162 is driven by a corresponding electric motor 164, 166 and raises the pressure of the air to a required pressure level for provision to the ECS. In alternative examples, one or both of the electric motors 164, 166 can be replaced or supplemented by a mechanical motor and/or a mechanical connection to a rotational source within the engine 120 or within the aircraft incorporating the engine 120. Once pressurized via the auxiliary compressors 160, 162 the air is provided to the ECS. In alternative examples, a single auxiliary compressor 160 can be used in place of the first and second auxiliary compressors 160, 162. In yet further alternative examples, three or more auxiliary compressors can be included, with the controller 101 rotating between the auxiliary compressors as necessary.

By cooling the bleed air prior to providing the bleed air to auxiliary compressors 160, 162, the amount of work required to compress the air at the auxiliary compressor 160, 162 is reduced, thereby achieving a fuel efficiency savings.

While the circuit 100 is illustrated in FIG. 2 with a single engine 120, a similar circuit can be utilized with multiple engines 120, with the air from the bleeds 102, 104, 106, 108 of each engine 120, being mixed after being cooled in a corresponding intercooler 130. Alternatively, the air from each engine 120 can be mixed at alternate positions in the ECS air circuit 100 prior to provision to auxiliary compressors 160, 162.

In the exemplary circuit 100 only one of the auxiliary compressors 160, 162 is required to provide sufficient pressurization to the ECS during standard operating conditions. As such, only a single auxiliary compressor 160, 162 is typically operated during a flight. In order to even out wear between the auxiliary compressors 160, 162 the primary operating auxiliary compressor 160, 162 is alternated between flights on a per flight basis. Alternating between auxiliary compressors 160, 162 further allows earlier detection, and correction, of a damaged or inoperable second auxiliary compressor 162.

During flight, when one engine 120 shuts down, either due to mechanical failure, or for any other reason, the air provided from the bleeds 102, 104, 106, 108, is reduced proportionally. By way of example, if there are two engines 120, and one shuts down, the air provided to the auxiliary compressors 160, 162 is cut in half. In order to remedy this, in the exemplary system when one engine 120 shuts down, the currently inactive auxiliary compressor 160, 162 begins operating simultaneously with the currently operating auxiliary compressor 160, 162. The simultaneous operations ensure that any lost pressure due to the loss of an engine is compensated for using air from the operating engine or engines. In aircraft having more than two auxiliary compressors 160, 162, the controller 101 can apply a proportional control to one or more of the auxiliary compressors to ensure that adequate pressure is maintained at the ECS in proportion to the pressure lost due to the lack of operation of the engine.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. An engine driven environmental control system (ECS) air circuit comprising:
a gas turbine engine including a compressor section having a low pressure compressor section and a high pressure compressor section downstream of the low pressure compressor section, the compressor section including a plurality of compressor bleeds, wherein the plurality of compressor bleeds includes a first bleed positioned at a location between the low pressure compressor and the high pressure compressor, a second bleed positioned at a third stage of the high pressure compressor, a third bleed positioned at a sixth stage of the high pressure compressor, and a fourth bleed positioned at an eighth stage of the high pressure compressor;
a selection valve selectively connecting each bleed of said plurality of compressor bleeds to an input of an intercooler; and
a second valve configured to selectively connect an output of said intercooler to at least one auxiliary compressor, the output of every auxiliary compressor of the at least one auxiliary compressors being connected to an ECS air input.

2. The engine driven ECS air circuit of claim 1, wherein the at least one auxiliary compressor comprises a plurality of auxiliary compressors.

3. The engine driven ECS air circuit of claim 1, wherein the intercooler is an air to air heat exchanger.

4. The engine driven ECS air circuit of claim 3, wherein a heat sink of the air to air heat exchanger is fan air.

5. The engine driven ECS air circuit of claim 1, further comprising an aircraft controller controllably connected to the selection valve and to the second valve such that the aircraft controller controls a state of the selection valve and a state of the second valve.

6. The engine driven ECS air circuit of claim 5, wherein the aircraft controller includes a memory storing instructions configured to cause the controller to connect a bleed of the plurality of compressor bleeds having a required flowrate for an ECS operating requirement, and wherein the connected bleed of the plurality of compressor bleeds has a pressure requirement below a pressure requirement of the ECS inlet.

7. The engine driven ECS air circuit of claim 5, wherein the at least one auxiliary compressor comprises a plurality of auxiliary compressors and wherein the aircraft controller includes a memory storing instructions configured to cause the controller to alternate auxiliary compressors operating as a primary compressor such that the primary compressor is alternated between each flight.

8. The engine driven ECS air circuit of claim 1, wherein at least one of said at least one auxiliary compressors includes an electric motor, and wherein the electric motor is configured to drive rotation of the corresponding auxiliary compressor.

9. The engine driven ECS air circuit of claim 1, wherein at least one of said at least one auxiliary compressor includes a mechanical motor, and wherein the mechanical motor is configured to drive rotation of the corresponding auxiliary compressor.

* * * * *